(12) United States Patent
Fender et al.

(10) Patent No.: US 11,797,520 B2
(45) Date of Patent: Oct. 24, 2023

(54) ROWID ELIMINATION REWRITE

(71) Applicant: Oracle International Corporation, Redwood Shores, CA (US)

(72) Inventors: Pit Fender, Union City, CA (US); Benjamin Schlegel, Merced, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 104 days.

(21) Appl. No.: 16/699,524

(22) Filed: Nov. 29, 2019

(65) Prior Publication Data

US 2021/0165778 A1 Jun. 3, 2021

(51) Int. Cl.
*G06F 7/00* (2006.01)
*G06F 16/23* (2019.01)
*G06F 16/22* (2019.01)
*G06F 16/2453* (2019.01)

(52) U.S. Cl.
CPC ...... *G06F 16/2379* (2019.01); *G06F 16/2282* (2019.01); *G06F 16/24534* (2019.01)

(58) Field of Classification Search
CPC ........... G06F 16/24549; G06F 16/2379; G06F 16/2282; G06F 16/24534; G06F 16/24535; G06F 16/24537; G06F 16/24539; G06F 16/2454; G06F 16/24; G06F 16/2452
USPC ............ 707/713, 999.001, 999.003, 999.004
See application file for complete search history.

(56) References Cited

U.S. PATENT DOCUMENTS

| | | | |
|---|---|---|---|
| 5,897,632 A | 4/1999 | Dar et al. | |
| 5,991,754 A | 11/1999 | Raitto et al. | |
| 6,339,769 B1 | 1/2002 | Cochrane et al. | |
| 6,370,524 B1 * | 4/2002 | Witkowski | G06F 16/24535 |
| 6,449,605 B1 | 9/2002 | Witkowski | |
| 6,449,606 B1 * | 9/2002 | Witkowski | G06F 16/24537 |
| 6,477,536 B1 | 11/2002 | Pasumansky et al. | |
| 6,496,819 B1 * | 12/2002 | Bello | G06F 16/24539 |
| 6,643,636 B1 * | 11/2003 | Au | G06F 16/24545 |
| 6,775,662 B1 | 8/2004 | Witkowski et al. | |
| 7,546,226 B1 | 6/2009 | Yeh et al. | |
| 8,359,325 B1 | 1/2013 | Gui et al. | |
| 8,521,723 B1 * | 8/2013 | Ahmed | G06F 16/24534 707/802 |
| 9,146,955 B2 | 9/2015 | Nos et al. | |
| 9,519,701 B2 | 12/2016 | Amule et al. | |
| 9,619,581 B2 | 4/2017 | Hughes et al. | |
| 10,067,954 B2 | 9/2018 | Kociubes et al. | |
| 10,558,659 B2 | 2/2020 | Hopeman et al. | |

(Continued)

FOREIGN PATENT DOCUMENTS

WO WO-9521407 A2 * 8/1995 ....... G06F 17/30445

OTHER PUBLICATIONS

Boncz et al., "TPC-H Analyzed: Hidden Messages and Lessons Learned from an Inuential Benchmar", dated 2013, 16 pages.

(Continued)

*Primary Examiner* — Md I Uddin
(74) *Attorney, Agent, or Firm* — Hickman Becker Bingham Ledesma LLP

(57) ABSTRACT

Techniques described herein propose a ROWID Elimination Rewrite that uses functional dependencies to substitute and/or eliminate ROWID pseudo-columns referenced in a query in order to reduce memory pressure and speed up processing.

22 Claims, 7 Drawing Sheets

(56) References Cited

U.S. PATENT DOCUMENTS

| | | |
|---|---|---|
| 2001/0013030 A1 | 8/2001 | Colby et al. |
| 2004/0122814 A1 | 6/2004 | Zhang et al. |
| 2011/0131199 A1 | 6/2011 | Simon et al. |
| 2011/0153593 A1 | 6/2011 | Zhou et al. |
| 2013/0238637 A1 | 9/2013 | Gupte et al. |
| 2014/0244690 A1 | 8/2014 | Vundavalli |
| 2018/0182049 A1 | 6/2018 | Oberle |
| 2018/0341677 A1 | 11/2018 | Fan et al. |
| 2019/0251194 A1 | 8/2019 | Fender |
| 2021/0224257 A1 | 7/2021 | Fender |
| 2022/0092069 A1 | 3/2022 | Hartsing et al. |

OTHER PUBLICATIONS

Rittmanmead, "Metadata Modeling in the Database with Analytic Views", Oracle Database, analytic views, metadata, obiee, DVD, database, analytic view, self-service reporting, Apr. 3, 2017, 15 pages.

Oracle® Database, "Database In-Memory Guide", 12c Release 2 (12.2), dated Jan. 2019, 227 pages.

Oracle® Database, "Database Data Warehousing Guide", 12c Release 2 (12.2), dated Jan. 2018, 699 pages.

Oracle, "Oracle Database In-memory: In-Memory Aggregation", Oracle White Paper, Jan. 2016, 13 pages.

Live SQL, "Creating Analytic Views—Getting Started", dated Jan. 4, 2017, 22 pages.

Fu et al., "CubiST: A New Algorithm for Improving the Performance of Ad-hoc OLAP Queries", dated 2000, 8 pages.

TPC Benchmark H Standard Specification Revision 2.17.1, dated Jun. 2013, located on webpage http://tpc.org/tpch/spec/tpch 2.17.1.pdf.

Eich et al, "Faster Plan Generation through Consideration of Functional Dependencies and Keys", PVLDB, vol. 9, dated 2016, 12 pages.

Bellamkonda et al., "Enhanced Subquery Optimizations in Oracle", PVLDB, 2(2):13661377, dated 2009, 12 pages.

Shane Grimes, "SQL Order by with aggregation", Sep. 8, 2015, 19 pages.

Daniel Hutmacher, "Blocking/non-blocking aggregate operators", Structured Concepts, Jun. 15, 2014, 6 pages.

Hartsing, U.S. Appl. No. 17/027,238, filed Sep. 21, 2020, Notice of Allowance and Fees Due, dated Jun. 6, 2022.

Hartsing, U.S. Appl. No. 17/027,238, filed Sep. 21, 2020, Final Rejection, dated Apr. 27, 2022.

Fender, U.S. Appl. No. 16/744,635, filed Jan. 16, 2020, Notice of Allowance and Fees Due, dated Mar. 23, 2022.

\* cited by examiner

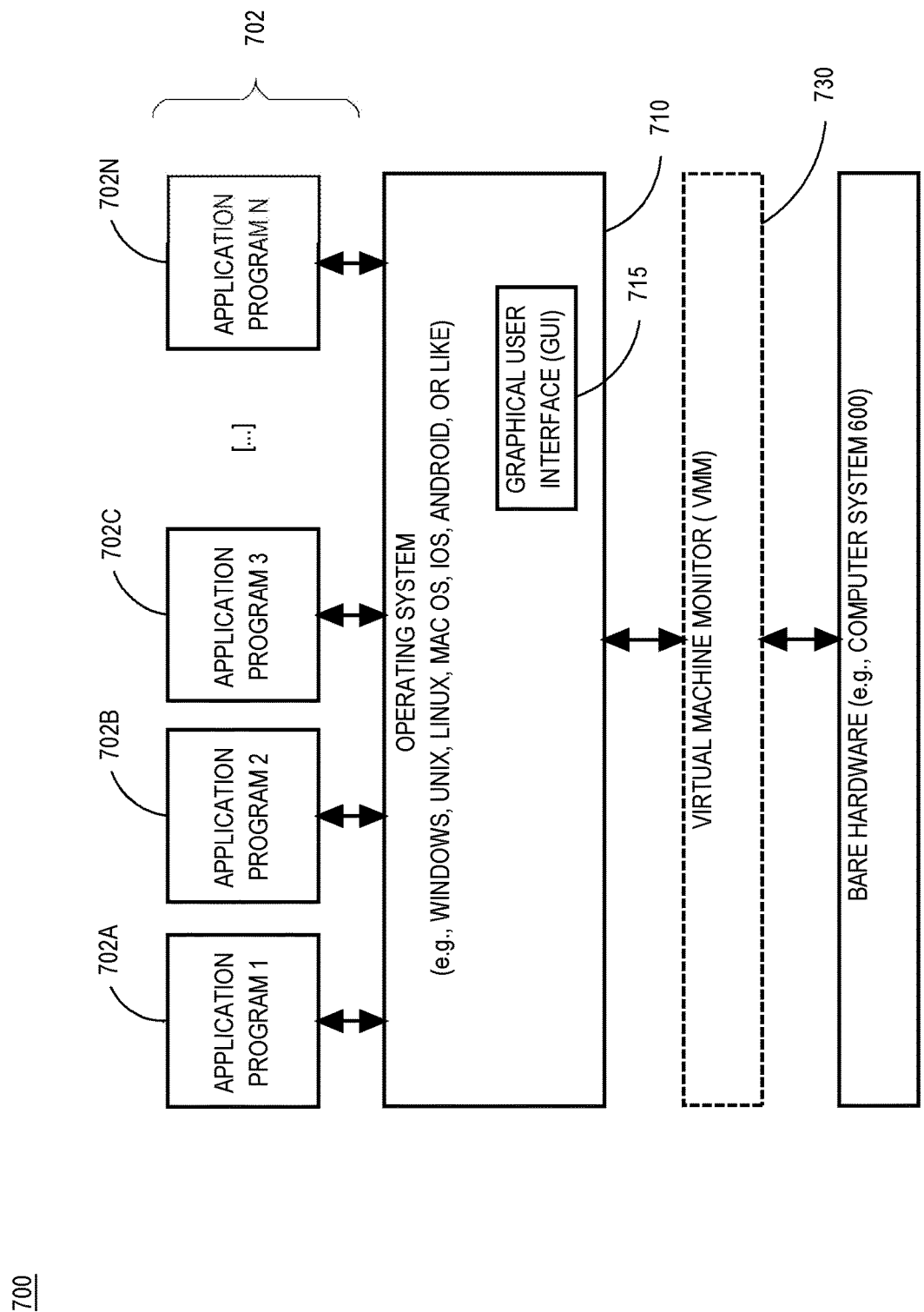

ROWID ELIMINATION REWRITE

CROSS-REFERENCE TO RELATED APPLICATIONS

This application is related to U.S. patent application Ser. No. 16/516,898, entitled "Driving Massive Scale Out through Rewrites of Analytical Functions," wherein the entire contents of which are hereby incorporated by reference as if fully set forth herein.

FIELD OF THE INVENTION

The present disclosure relates to the field of database systems, and in particular to rewrite techniques. For instance, the disclosed rewrite techniques eliminate pseudo-columns referenced in a query.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern RDBMS like the Oracle RDBMS employ query rewrite techniques to yield better Query Execution Plans (QEP). A family of import rewrite techniques involves the area of query unnesting, because evaluation of subqueries can be very expensive and a QEP with an unnested subquery can be executed order of magnitudes faster. The optimizer of the ORACLE RDBMS uses rewrite techniques that employ the usage of ROWIDs. That is, ROWIDs are not referenced in the original query but are introduced, through the query rewrite, in the rewritten query.

TPC is a non-profit corporation founded to define transaction processing and database benchmarks and has developed and published specifications including decision support benchmarks, such as TPC-H. There are three (3) out of 23 TPC-H Benchmark queries where modern optimizers, like the one of the Oracle RDBMS, introduce ROWID pseudo-columns for purpose of query unnesting.

The introduction of ROWIDs is problematic for some offload engines for numerous reasons. First, ROWID is of a relatively large data type (10 Bytes) that increases memory pressure during processing. Further, ROWID processing may not be supported well, if at all, by special hardware that provides hardware acceleration for data movement and partitioning operations.

Described herein are support ROWID based rewrite or transformation techniques that can be offloaded to DBMSs that do not support ROWIDs.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 7 illustrates a block diagram of a basic software system for controlling the operation of a computing device.

DETAILED DESCRIPTION

Figure 1:
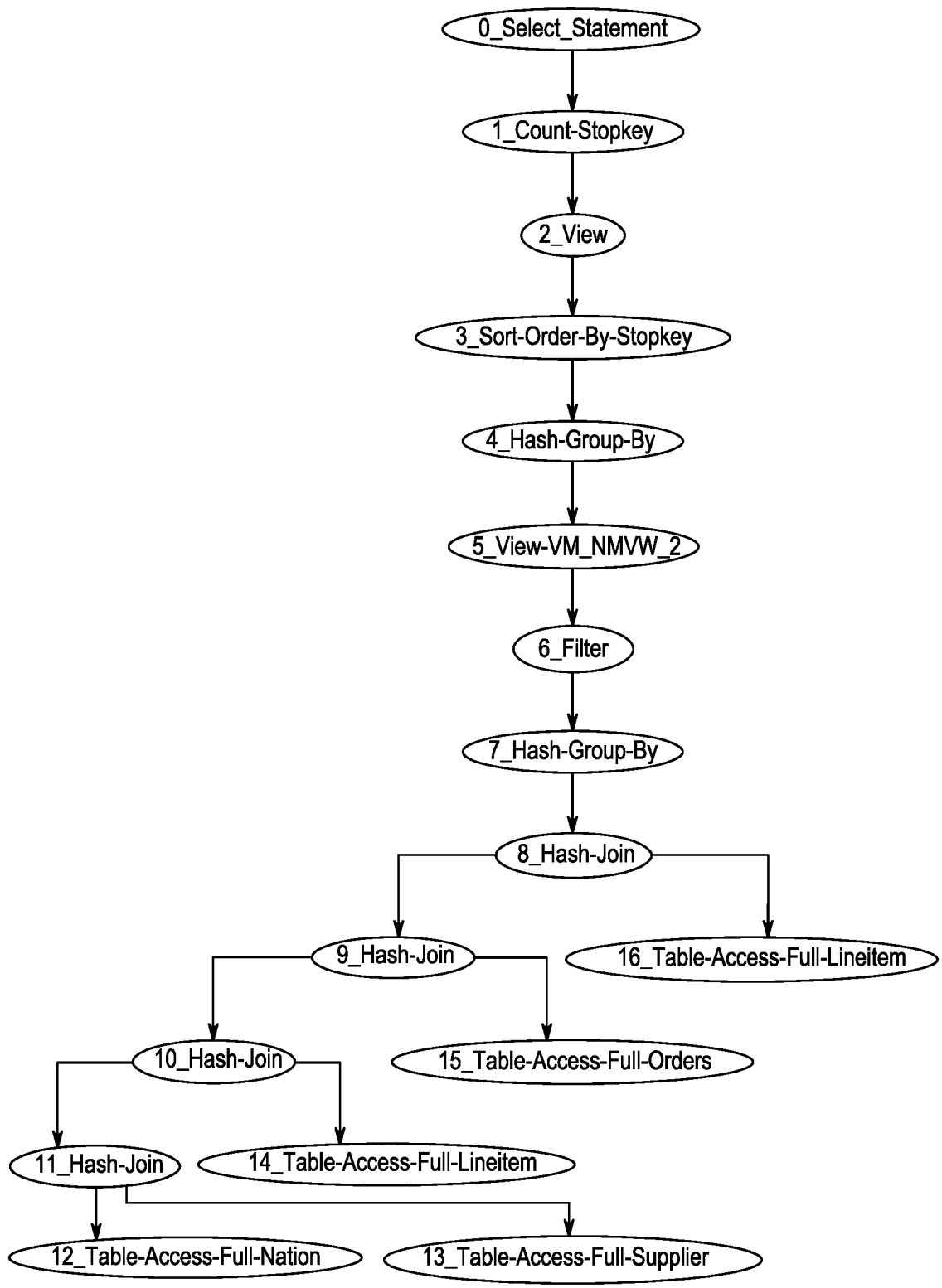
FIG. 1 illustrates a query execution plan of rewritten TPC-H Q21.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Modern query optimizers, like the optimizer of Oracle RDBMS, rewrite queries with nested subqueries to speed up processing by order of magnitudes. A rewritten query may introduce ROWIDs from tables to prevent the output of duplicates. However, in the context of offload engines, the processing of those type of queries is often not possible. In fact, often the offload of the whole query is not possible, because tables are often not loaded together with the ROW-IDs. A ROWID is a pseudo column that uniquely identifies a row in a database. It indicates the storage location of the row within a database. For example, a ROWID of a row may include data block address of a data block that stores the row and ordinal position of the row among the rows in the data block. A pseudo column is column that may be referenced in a database statement and treated by a DBMS as a defined column even though the pseudo column is not defined for the table by the database dictionary of the database. The DBMS generates a column value to return for the column as part of executing the database statement.

For example, when executing a database statement, the DBMS returns a row from a data block. The DBMS generates a ROWID derived, at least in part, from the data block address of the data block the ordinal position of the row in the data block.

In an embodiment, a RDBMS ROWID includes the following elements: a data object number of an object, a datafile in which a row resides, a data block in the datafile in which the row resides, and a position of the row in the data block. However, since loaded data in an offload engine have a different data layout, ROWIDs in the offload engine will be different from ROWIDs in the RDBMS. Therefore, the RDBMS ROWIDs will not be available unless they were specifically materialized during loading.

However, even assuming the RDBMS ROWIDs are available, the offload engine may not be able to process them efficiently. A RDBMS ROWID is a 64-base String occupying 10 Bytes and, as such, using RDBMS ROWIDS during processing increases memory pressure. Further, the data type may not be supported well, if at all, by special hardware that provides hardware acceleration for data movement and partitioning operations.

Accordingly, rewritten queries that specify RDBMS ROWIDs are in most scenarios not be feasible to be executed in an offload engine or, if feasible, are often not supported by special hardware that provides hardware acceleration for data movement and partitioning operations.

A ROWID Elimination Rewrite technique described herein substitutes ROWIDs with other columns of the same table. In some scenarios, the ROWID Elimination Rewrite technique is able to remove ROWIDs altogether. ROWID Elimination Rewrite technique reduces the memory pressure and enable queries to be executed in an offload engine.

For the TPC-H Benchmark, the ROWID Elimination Rewrite technique is applicable for three (3) queries out of 23.

Query Optimization Overview

In query optimization, a query rewrite technique may rewrite a representation of a query from one form to another form as long as the two forms are semantically equivalent to each other. The representation of the query may be the query expression or code itself or may be an internally and/or externally recognized representation of the query, such as a query execution tree or other data structure. If the representation does not include the query expression itself, the representation may include data that describes processes that may be performed to execute the query, such as a query execution plan (QEP). A QEP is a set of directives and metadata that is prepared for an execution engine.

As used herein, a query representation is "rewritten" when the representation represents a rewritten version of the query, after the query has been rewritten from a first version to a second version. A first version may be an original query or may be another version rewritten from the original query. Two query representations are semantically equivalent to each other when the two query representations, if executed, would produce equivalent result sets, even if the result sets are assembled in different manners by the two query representations.

Expression Tree

An expression tree is a tree having a height of a least one, where every node in the tree can be one of the following types:

input columns: Input columns can either be base columns (e.g., if the expression tree is part of a table scan, or can point to columns that are attributes of intermediate relations. Input column nodes must be leaf nodes in an expression tree or root nodes, if there is just one node in the expression tree.

operands: This node type is also known as expression-node. Expression-nodes can represent arithmetic operands or comparison operands. Expression-nodes are either root nodes or inner nodes in the expression tree.

constants: This node type is also known as constant-node. Constant-nodes must be leaf nodes in an expression tree or root nodes, if there is just one node in the expression tree.

Each element of a projection list of an operator is an expression tree. A predicate is also an expression tree. An ORDER BY or GROUP BY column is also an expression tree.

Unnested Query Rewrites of TPC-H Query 21, Query 20 and Query 2

The three (3) TPC-H queries where modern optimizers like the Oracle Optimizer applies rewrites, for purpose of query unnesting, that result in the usage of ROWIDs are TPC-H query 2 (also herein referred to as Q2), TPC-H query 20 (also herein referred to as Q20), and TPC-H query 21 (also herein referred to as Q21). The Oracle Optimizer employs query unnesting for these TPC-H queries in the form of two rewrites applied in sequence: a Subquery Coalescing Rewrite and a View Merging Rewrite. The representation of each unnested query and the representation of its corresponding original query are semantically equivalent as they both produce equivalent result sets. Each of these three (3) TPC-H queries is discussed below.

Table 1 shows the original TPC-H Q21. Table 2 shows the unnested rewritten TPC-H Q21, after the Subquery Coalescing Rewrite and the View Merging Rewrite are applied. The queries shown in Tables 1 and 2 are semantically equivalent. As shown in Table 2, the unnested rewritten TPC-H Q21 introduces ROWIDs. FIG. 1 illustrates a QEP of rewritten TPC-H Q21.

TABLE 1

Original TPC-H Q21

```
SELECT  /*Q21*/
FROM    (SELECT  SNAME,
                 Count (*) AS numwait
         FROM    SUPPLIER,
                 LINEITEM L1,
                 ORDERS,
                 NATION
         WHERE   S_SUPPKEY = L1.L_SUPPKEY
                 AND O_ORDERKEY = L1.L_ORDERKEY
                 AND O_ORDERSTATUS = 'F'
                 AND L1.L_RECEIPTDATE > L1.L_COMMITDATE
                 AND EXISTS (SELECT *
                             FROM   LINEITEM L2
                             WHERE  L2.L_ORDERKEY = L1.L_ORDERKEY
                                    AND L2.L_SUPPKEY <>
                                    L1.L_SUPPKEY)
                 AND NOT EXISTS (SELECT *
                                 FROM LINEITEM L3
                                 WHERE
                 L3.L_ORDERKEY = L1.L_ORDERKEY
                                        AND L3.L_SUPPKEY <>
                                        L1.L_SUPPKEY
                                        AND L3.L_RECEIPTDATE >
                                        L3.L_COMMITDATE)
```

TABLE 1-continued

Original TPC-H Q21

```
                AND S_NATIONKEY = N_NATIONKEY
                AND N_NAME = 'SAUDIA_ARABIA'
        GROUP   BY S_NAME
        ORDER   BY NUMWAIT DESC,
                   S_NAME)
WHERE ROWNUM <= 100;
```

TABLE 2

Unnested rewritten TPC-H Q21

```
SELECT  /*Q21*/ "FROM$_SUBQUERY$_001"."S_NAME" "S_NAME",
        "FROM$_SUBQUERY$_001"."NUMWAIT" "NUMWAIT"
FROM (SELECT "VM_NWVW_2"."$VM_COL_1" "S_NAME",
                  Count (*) "NUMWAIT"
      FROM (SELECT "SUPPLIER"."S_NAME" "$VM_COL_1"
            FROM    "TPCH"."LINEITEM" "L3",
                    "TPCH"."SUPPLIER" "SUPPLIER",
                    "TPCH"."LINEITEM" "L1",
                    "TPCH"."ORDERS" "ORDERS",
                    "TPCH"."NATION" "NATION"
            WHERE "SUPPLIER"."S_SUPPKEY" = "L1"."L_SUPPKEY"
                    AND "ORDERS"."O_ORDERKEY" = "L1"."L_ORDERKEY"
                    AND "ORDERS"."O_ORDERSTATUS" = 'F'
                    AND "L1"."L_RECEIPTDATE" > "L1"."L_COMMITDATE"
                    AND 0 < 1
                    AND "SUPPLIER"."S_NATIONKEY" =
                    "NATION"."N_NATIONKEY"
                    AND "NATION"."N_NAME" =
                    'SAUDI_ARABIA'
                    AND "L3"."L_ORDERKEY" = "L1"."L_ORDERKEY"
                    AND "L3"."L_SUPPKEY" <> "L1"."L_SUPPKEY"
            GROUP BY    "L1".ROWID,
                        "NATION".ROWID,
                        "ORDERS".ROWID,
                        "SUPPLIER".ROWID,
                        "SUPPLIER"."S_NAME"
            HAVING      SUM (CASE
                            WHEN "L3"."L_RECEIPTDATE" >
                              "L3"."L_COMMITDATE"
                            THEN  1
                            ELSE  0
                            END) = 0) "VM_NWVW_2"
      GROUP BY "VM_NWVW_2"."$VM_COL_1"
      ORDER BY COUNT(*) DESC,
                    "VM_NWVW_2"."$VM_COL_1")
                    "FROM$_SUBQUERY$_001"
WHERE ROWNUM <= 100;
```

It can be observed, from Table 2, that the ROWIDs are only used by a grouping operator (operator 4 depicted in FIG. 1). Specifically, as grouping columns, only the ROWIDs from all base tables that went into a hash join operator (operator 9 depicted in FIG. 1) were added. The ROWIDs from the second LINEITEM table referenced as L3 were not added as that would have rendered the GROUP BY operation useless, because the aggregation columns are L3.L_RECEIPTDATE and L3.L_COMMITDATE.

Figure 2:
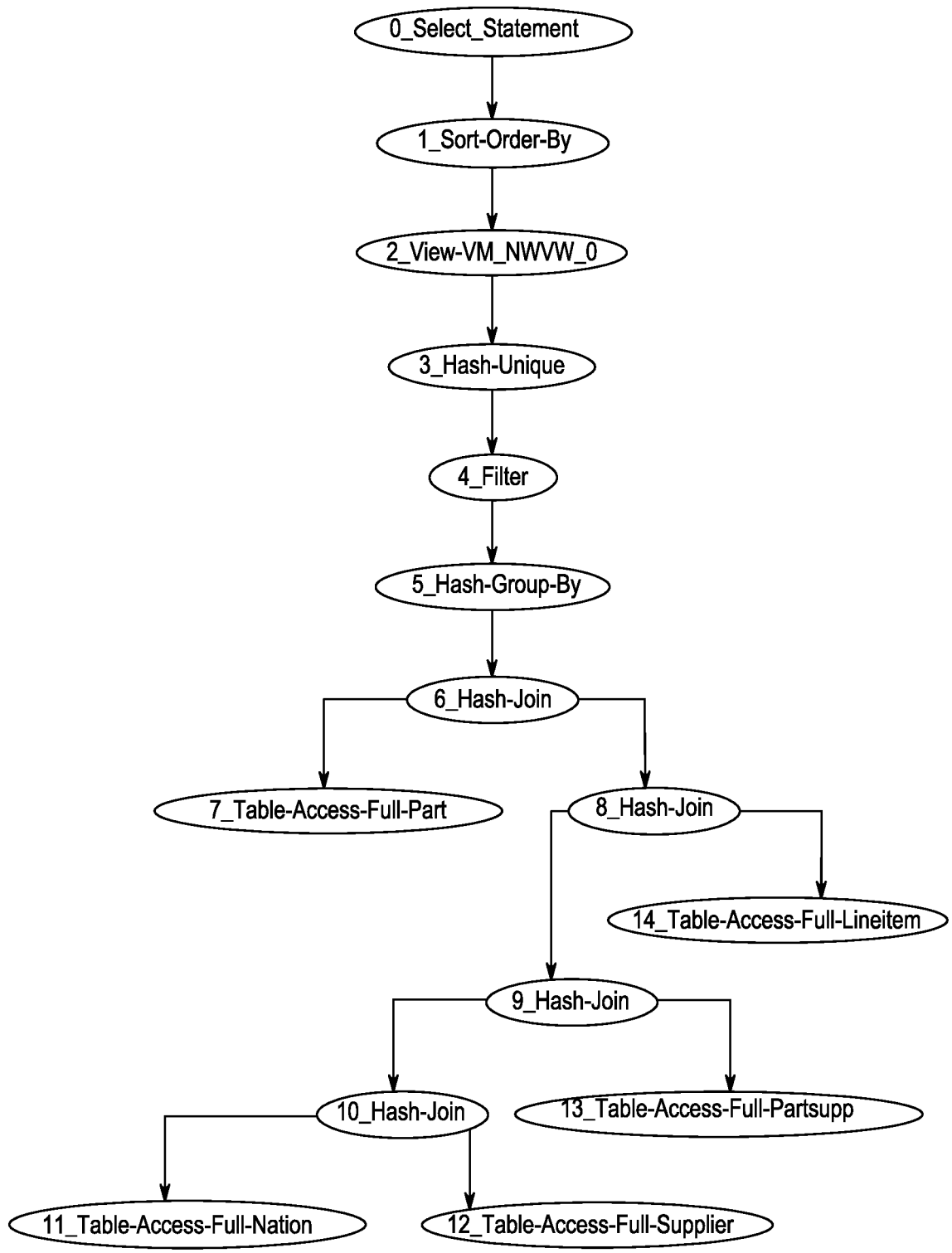
FIG. 2 illustrates a query execution plan of rewritten TPC-H Q20.

Table 3 shows the original TPC-H Q20. Table 4 shows the unnested rewritten TPC-H Q20, after the Subquery Coalescing Rewrite and the View Merging Rewrite are applied. The queries shown in Tables 3 and 4 are semantically equivalent. As shown in Table 4, the unnested rewritten TPC-H Q20 introduces ROWIDs. FIG. 2 illustrates a QEP of rewritten TPC-H Q20.

TABLE 3

Original TPC-H Q20

```
SELECT  /*Q20*/ S_NAME,
                S_ADDRESS
FROM    SUPPLIER,
        NATION
WHERE S_SUPPKEY IN (
            SELECT PS_SUPPKEY
            FROM   PARTSUPP
            WHERE PS_PARTKEY IN (SELECT P_PARTKEY
                    FROM PART
                    WHERE P_NAME LIKE 'forest%')
                AND PS_AVAILQTY > (
                    SELECT 0.5 * SUM (L_QUANTITY)
                    FROM LINEITEM
                    WHERE L_PARTKEY
                        = PS_PARTKEY
                    AND L_SUPPKEY =
```

TABLE 3-continued

Original TPC-H Q20

```
                                PS_SUPPKEY
                                AND L_SHIPDATE >=
                                    DATE '1994-01-01'
                                AND L_SHIPDATE <
                                    DATE '1994-01-01' +
                                    INTERVAL '1' YEAR) )
    AND S_NATIONKEY = N_NATIONKEY
    AND N_NAME = 'CANADA'
ORDER BY S_NAME
```

TABLE 4

Unnested rewritten TPC-H Q20

```
SELECT      /*Q20*/ "VM_NWVW_3"."$VM_COL_3" "S_NAME",
            "VM_NWVW_3"."$VM_COL_2" "S_ADDRESS"
FROM        (SELECT DISTINCT "SUPPLIER"."S_NAME" "$VM_COL_3",
                        "SUPPLIER".ROWID "ROWID",
                        "NATION".ROWID "ROWID",
                        "PARTSUPP"."PS_SUPPKEY" "$VM_COL_1",
                        "SUPPLIER"."S_ADDRESS" "$VM_COL_2"
    FROM            "TPCH"."LINEITEM" "LINEITEM",
                    "TPCH"."PART" "PART",
                    "TPCH"."PARTSUPP" "PARTSUPP",
                    "TPCH"."SUPPLIER" "SUPPLIER",
                    "TPCH"."NATION" "NATION"
    WHERE           "SUPPLIER"."S_SUPPKEY" = "PARTSUPP"."PS_SUPPKEY"
                    AND "SUPPLIER"."S_NATIONKEY" =
                    "NATION"."N_NATIONKEY"
                    AND "NATION"."N_NAME" = 'CANADA'
                    AND "LINEITEM"."L_PARTKEY" =
                    "PARTSUPP"."PS_PARTKEY"
                    AND "LINEITEM"."L_SUPPKEY" =
                    "PARTSUPP"."PS_SUPPKEY"
                    AND "PARTSUPP"."PS_PARTKEY" =
                    "PART"."P_PARTKEY"
                    AND "PART"."P_NAME" LIKE 'forest%'
                    AND "LINEITEM"."L_SHIPDATE" >=
                        To date ('1994-01-01 00:00:00', 'syyyy-mm-
                        dd hh24:mi:ss')
                    AND "LINEITEM"."L_SHIPDATE" <
                        To date('1995-01-01 00:00:00', 'syyyy-mm-
                        dd hh24:mi:ss')
                    AND To date('1995-01-01 00:00:00','syyyy-mm-
                        dd hh24:mi:ss')
                        To date('1994-01-01 00:00:00', 'syyyy-mm-
                        dd hh24:mi:ss')
    GROUP           BY "SUPPLIER"."S_NAME",
                    "LINEITEM"."L_SUPPKEY",
                    "PARTSUPP".ROWID,
                    "PART".ROWID,
                    "PARTSUPP"."PS_AVAILQTY",
                    "PARTSUPP"."PS_SUPPKEY",
                    "NATION".ROWID,
                    "SUPPLIER".ROWID,
                    "LINEITEM"."L_PARTKEY",
                    "SUPPLIER"."S_ADDRESS"
    HAVING "PARTSUPP"."PS_AVAILQTY" >
            0.5 * SUM( LINEITEM"."L_QUANTITY") ) "VM_NWVW_3"
ORDER  BY "VM_NWVW_3"."$VM_COL_3"
```

It can be observed, from Table 4, that the ROWIDs are introduced as part of a grouping operator (operator 5 depicted in FIG. 2). Here, additionally to the grouping columns, ROWIDs are used as projection columns (SELECT clause) in form of a unique operator (operator 3 depicted in FIG. 2). It can also be observed that for the grouping columns, the ROWIDs from all base table, except for the LINEITEM table, are selected, because LINEITEM.L_QUANTITY is used as an aggregation column.

With the notion of an expression tree, it can be observed that the ROWIDs introduced through query unnesting rewrites for both TPC-H Q21 and TPC-H Q20 are always the root of an expression tree, where the height of the tree is one. In other words, the ROWIDs introduced through unnesting rewrites do not occur in expressions with more than one element.

Figure 3:
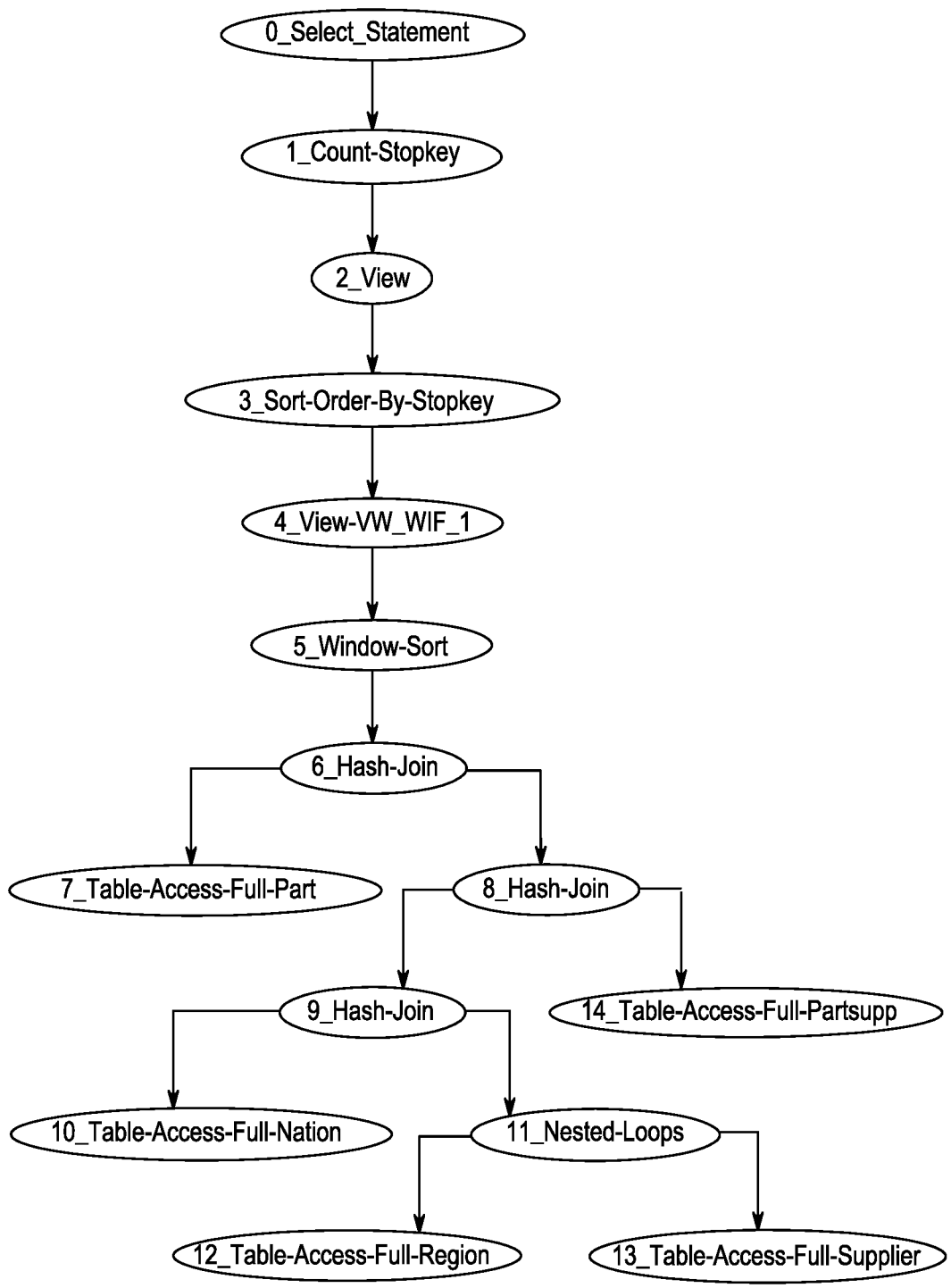
FIG. 3 illustrates a query execution plan of rewritten TPC-H Q2.

Table 5 shows the original TPC-H Q2. Table 6 shows the unnested rewritten TPC-H Q2, after the Subquery Coalescing Rewrite and the View Merging Rewrite are applied. The queries shown in Tables 5 and 6 are semantically equivalent. As shown in Table 6, the unnested rewritten TPC-H Q2 introduces ROWIDs. FIG. 3 illustrates a QEP of rewritten TPC-H Q2.

TABLE 5

Original TPC-H Q2

```
SELECT    /*Q2*/
FROM      (SELECT  S_ACCTBAL,
                   S_NAME,
                   N_NAME,
                   P_PARTKEY,
                   P_MFGR ,
                   S_ADDRESS,
                   S_PHONE,
                   S_COMMENT
           FROM    PART,
                   SUPPLIER,
                   PARTSUPP,
                   NATION,
                   REGION
           WHERE   P_PARTKEY = PS_PARTKEY
                   AND S_SUPPKEY = PS_SUPPKEY
                   AND P_SIZE = 15
                   AND P_TYPE LIKE '%BRASS'
                   AND S_NATIONKEY = N_NATIONKEY
                   AND N_REGIONKEY = R_REGIONKEY
                   AND R_NAME = 'EUROPE'
                   AND PS_SUPPLYCOST = (SELECT Min (PS_SUPPLYCOST)
                                        FROM    PARTSUPP,
                                                SUPPLIER,
                                                NATION,
                                                REGION
                                        WHERE
                                                P_PARTKEY =
                                                PS_PARTKEY
                                                AND S_SUPP =
                                                PS_SUPPKEY
                                                AND S_NATIONKEY =
                                                N_NATIONALKEY
                                                AND N_REGIONKEY =
                                                R_REGIONKEY
                                                AND R_NAME = 'EUROPE'
           ORDER   BY S_ACCTBAL DESC,
                   N_NAME,
                   S_NAME,
                   P_PARTKEY)
WHERE ROWNUM <= 100;
```

TABLE 6

Unnested rewritten TPC-H Q2

```
SELECT    /*Q2*/ "FROM$_SUBQUERY$_001"."S_ACCTBAL" "S ACCTBAL",
          "FROM$_SUBQUERY$_001"."S-NAME" "S_NAME",
          "FROM$_SUBQUERY$_001"."N_NAME" "N_NAME",
          "FROM$_SUBQUERY$_001"."P_PARTKEY" "P_PARTKEY",
          "FROM$_SUBQUERY$_001"."P_MFGR" "P_MFGR",
          "FROM$_SUBQUERY$_001"."S_ADDRESS" "S_ADDRESS",
          "FROM$_SUBQUERY$_001"."S_PHONE" "S_PHONE",
          "FROM$_SUBQUERY$_001"."S_COMMENT" "S_COMMENT"
FROM (SELECT   "VW_WIF_1"."ITEM_1" "S_ACCTBAL",
               "VW_WIF_1"."ITEM_2" "S_NAME",
               "VW_WIF_1"."ITEM_3" "N_NAME",
               "VW_WIF_1"."ITEM_4" "P_PARTKEY",
               "VW_WIF_1"."ITEM_5" "P_MFGR",
               "VW_WIF_1"."ITEM_6" "S_ADDRESS",
               "VW_WIF_1"."ITEM_7" "S_PHONE",
               "VW_WIF_1"."ITEM_8" "S_COMMENT"
      FROM (SELECT    "SUPPLIER"."S_ACCTBAL" "ITEM_1",
                      "SUPPLIER"."S_NAME" "ITEM_2",
                      "NATION"."N_NAME" "ITEM_3",
                      "PART"."P_PARTKEY" "ITEM_4",
                      "PART"."P_MFGR" "ITEM_5",
                      "SUPPLIER"."S_ADDRESS" "ITEM_6",
                      "SUPPLIER"."S_PHONE" "ITEM_7",
                      "SUPPLIER"."S_COMMENT" "ITEM_8",
                      CASE "PARTSUPP"."PS_SUPPLYCOST"
                           WHEN Min("PARTSUPP"."PS_SUPPLYCOST")
                                OVER (
                                     PARTITION BY
                                          "PARTSUPP"."PS_PARTKEY") THEN
```

TABLE 6-continued

Unnested rewritten TPC-H Q2

```
                        "PARTSUPP".ROWID
                    END "VW_COL_9"
            FROM    "TPCH"."REGION" "REGION",
                    "TPCH"."NATION" "NATION",
                    "TPCH"."PARTSUPP" "PARTSUPP",
                    "TPCH"."SUPPLIER" "SUPPLIER",
                    "TPCH"."PART" "PART"
            WHERE   "REGION"."R_NAME" = 'EUROPE'
                    AND "NATION"."N_REGIONKEY" =
                    "REGION"."R_REGIONKEY"
                    AND "SUPPLIER"."S_NATIONKEY" =
                    "NATION"."N_NATIONKEY"
                    AND "PART"."P_TYPE" LIKE '%BRASS'
                    AND "PART"."P_SIZE" = 15
                    AND "SUPPLIER"."S_SUPPKEY" =
                    "PARTSUPP"."PS_SUPPKEY"
                    AND "PART"."P_PARTKEY" =
                    "PARTSUPP"."PS_PARTKEY")
            "VW_WIF_1"
    WHERE       "VW_WIF_1"."VW_COL_9" IS NOT NULL
    ORDER       BY "VW_WIF_1"."ITEM_1" DESC,
                    "VW_WIF_1"."ITEM_3",
                    "VW_WIF_1"."ITEM_2",
                    "VW_WIF_1"."ITEM_4") "FROM$_SUBQUERY$_001"
WHERE ROWNUM <= 100;
```

It can be observed, from Table 6, that the ROWIDs are introduced as part of an expression tree of size greater than 1. In particular, they are evaluated as part of a window function operator (operator 5 depicted in FIG. 3). The root of the expression tree is a CASE statement that is consumed only by a filter (operator 5 depicted in FIG. 3). The filter is a NOT NULL check, and the ROWID is used as a pseudo attribute that never can be null as long as there is a non-empty row.

For all of these rewritten queries, it can also be observed that if a ROWID is introduced, it is never selected in the projection list of a main or topmost query block. In other words, a ROWID is never part of the SELECT clause of the main query block.

ROWID Elimination Rewrite Criteria

From the above-described observations, if a ROWID is introduced as part of a query unnesting rewrite, its expression tree has a height not larger than one, except when the ROWID is used as part of a CASE statement. In those scenarios, not all branches of the CASE statement reference the ROWID, and the CASE statement is the top of the expression tree. Upstream operators consuming the CASE statement are not arithmetic or logical operations, with the exception of a NULL check. Also, from the above-described observations, a ROWID introduced by a query rewrite is not referenced as part of the projection list of the main query block.

Accordingly, as a general rule, the ROWID Elimination Rewrite is only applied on ROWID columns that have been previously introduced through other query rewrite transformations.

There are different ways to determine applicability. One way to determine applicability is to check whether all of the above-described observations hold true for a given ROWID column; if so, then the ROWID Elimination Rewrite is applicable. Another way to determine applicability is to compare the original query with the rewritten query; only the ROWIDs columns that are not referenced in the original query are applicable for the ROWID Elimination Rewrite.

Determining Substitution Columns

A principle idea behind the ROWID Elimination Rewrite is to substitute applicable ROWIDs with alternative columns while preserving the semantics of the rewritten query.

As discussed above, one important characteristic of the rewritten queries in Tables 2, 4, and 6 is that ROWIDs that are introduced through a different query rewrite will not appear in the projection list of the main query block. In other words, those type of ROWIDs are not part of the query result. Another important characteristic follows from the first characteristic: if a ROWID of a base table uniquely identifies the values of all the attributes of a tuple of the base relation, then the ROWID cannot be null.

Referring to Tables 2, 4, and 6, ROWIDs are used for two reasons. First, ROWIDs are used to uniquely identify a tuple of a base relation. This characteristic was used for TPC-H Q20 and Q21. Here, the ROWIDs are used as grouping columns. For TPC-H Q20, ROWIDs are also used for a distinct operation (e.g., HASH UNIQUE). However, a GROUP BY operator can also be used to implement this distinct operation. Second, ROWIDs cannot be null. In other words, given a base table tuple, its ROWID attribute can never be null. This characteristic was used for TPC-H Q2.

Accordingly, only a specific type of columns can be used to substitute a ROWID. For that type of columns, the same characteristics must hold to adhere to the principle idea described above. The characteristics described above are formalized as functional dependencies (FD).

FDs are an important property in a database. Within a relational database, a FD exists between two attributes A and B in a relation if for every value of A in a tuple of the relation the same value of B exists in the tuple. In other words, within a relation, B is functionally dependent on A if for every value in A for which there is an instance in a tuple, the same value of B exists in the tuple. The notation of A functionally determines B is A→B. The right-side has a set of one or more attributes, and left-side has one attribute. The attribute on the right side is dependent on the combination of attributes on the left side of the FD.

A set of rows or tuples in a table or other type of relation are referred to as being functionally dependent on a column (or attribute) if for every column value in the column the column uniquely identifies or corresponds to one and only one row or tuple within the set.

A primary key is a column that uniquely identifies each row in a table. Thus, rows in the table are functionally dependent on the primary key. Primary keys can thus uniquely identify all other columns (e.g., a tuple) of a base relation. Therefore, primary keys are valid substitution columns for ROWIDs that have been introduced through previous query rewrites.

Table 7 shows the rewritten query for TPC-H Query 21 after ROWID Elimination Rewrite has been applied.

TABLE 7

Result of the ROWID Elimination Rewrite for TPC-H Q21

```
SELECT   /*Q21*/ "FROM$_SUBQUERY$_001"."S_NAME" "S_NAME",
         "FROM$_SUBQUERY$_001"."NUMWAIT" "NUMWAIT"
FROM (SELECT "VM_NWVW_2"."$VM_COL_1" "S_NAME",
Count (*) "NUMWAIT"
    FROM (SELECT "SUPPLIER"."S_NAME" "$VM_COL_1"
        FROM    "TPCH"."LINEITEM" "L3",
                "TPCH"."SUPPLIER" "SUPPLIER",
                "TPCH"."LINEITEM" "L1",
                "TPCH"."ORDERS" "ORDERS",
                "TPCH"."NATION" "NATION"
        WHERE "SUPPLIER"."S_SUPPKEY" = "L1"."L_SUPPKEY"
                AND "ORDERS"."O_ORDERKEY" = "L1"."L_ORDERKEY"
                AND "ORDERS"."O_ORDERSTATUS" = 'F'
                AND "L1"."L_RECEIPTDATE" > "L1"."L_COMMITDATE"
                AND 0 < 1
                AND "SUPPLIER"."S_NATIONKEY" =
                "NATION"."N_NATIONKEY"
                AND "NATION"."N_NAME" =
                'SAUDI_ARABIA'
                AND "L3"."L_ORDERKEY" = "L1"."L_ORDERKEY"
                AND "L3"."L_SUPPKEY" <> "L1"."L_SUPPKEY"
        GROUP BY    "L1"."L_ORDERKEY",
                    "L1"."L_LINENUMBER",
                    "NATION"."N_NATIONKEY",
                    "ORDERS"."O_ORDERKEY",
                    "SUPPLIER"."S_SUPPKEY",
                    "SUPPLIER"."S_NAME"
        HAVING      SUM(CASE
                        WHEN "L3"."L_RECEIPTDATE" >
                        "L3"."L_COMMITDATE"
                    THEN 1
                    ELSE 0
                    END) = 0) "VM_NWVW_2"
    GROUP BY "VM_NWVW_2"."$VM_COL_1"
    ORDER BY    COUNT(*) DESC,
                "VM_NWVW_2"."$VM_COL_1")
                "FROM$_SUBQUERY$_001"
WHERE ROWNUM <= 100;
```

Table 8 shows the rewritten query for TPC-H Query 20 after ROWID Elimination Rewrite has been applied.

TABLE 8

Result of the ROWID Elimination Rewrite for TPC-H Q20

```
SELECT   /*Q20*/ "VM_NWVW_3"."$VM_COL_3" "S_NAME",
         "VM_NWVW_3"."$VM_COL_2" "S_ADDRESS"
FROM     (SELECT DISTINCT "SUPPLIER"."S_NAME" "$VM_COL_3",
                "SUPPLIER".ROWID "ROWID",
                "NATION".ROWID "ROWID",
                "PARTSUPP"."PS_SUPPKEY" "$VM_COL_1",
                "SUPPLIER"."S_ADDRESS" "$VM_COL_2"
        FROM    "TPCH"."LINEITEM" "LINEITEM",
                "TPCH"."PART" "PART",
                "TPCH"."PARTSUPP" "PARTSUPP",
                "TPCH"."SUPPLIER" "SUPPLIER",
                "TPCH"."NATION" "NATION"
        WHERE   "SUPPLIER"."S_SUPPKEY" = "PARTSUPP"."PS_SUPPKEY"
                AND "SUPPLIER"."S_NATIONKEY" =
                "NATION"."N_NATIONKEY"
                AND "NATION"."N_NAME" = 'CANADA'
                AND "LINEITEM"."L_PARTKEY" =
                "PARTSUPP"."PS_PARTKEY"
                AND "LINEITEM"."L_SUPPKEY" =
                "PARTSUPP"."PS_SUPPKEY"
```

TABLE 8-continued

Result of the ROWID Elimination Rewrite for TPC-H Q20

|   |   |   |
|---|---|---|
|   |   | AND "PARTSUPP"."PS_PARTKEY" = "PART"."P_PARTKEY" |
|   |   | AND "PART"."P_NAME" LIKE 'forest%' |
|   |   | AND "LINEITEM"."L_SHIPDATE" >= |
|   |   | To date ('⎵1994-01-01⎵00:00:00', 'syyyy-mm-dd⎵hh24:mi:ss') |
|   | AND | "LINEITEM"."L_SHIPDATE" < |
|   |   | To date('⎵1995-01-01⎵00:00:00', 'syyyy-mm-dd⎵hh24:mi:ss') |
|   | AND | To date('⎵1995-01-01⎵00:00:00', 'syyyy-mm-dd⎵hh24:mi:ss') |
|   |   | To date('⎵1994-01-01⎵00:00:00', 'syyyy-mm-dd⎵hh24:mi:ss') |
|   | GROUP BY | "SUPPLIER"."S_NAME", |
|   |   | "LINEITEM"."L_SUPPKEY", |
|   |   | "PARTSUPP"."PS_PARTKEY", |
|   |   | "PART"."P_PARTKEY", |
|   |   | "PARTSUPP"."PS_AVAILQTY", |
|   |   | "PARTSUPP"."PS_SUPPKEY", |
|   |   | "NATION"."N_NATIONKEY", |
|   |   | "SUPPLIER"."S_SUPPKEY", |
|   |   | "LINEITEM"."L_PARTKEY", |
|   |   | "SUPPLIER"."S_ADDRESS" |
|   | HAVING "PARTSUPP"."PS_AVAILQTY" > |   |
|   |   | 0.5 * SUM( LINEITEM"."L_QUANTITY") ) "VM_NWVW_3" |
| ORDER | BY "VM_NWVW_3"."$VM_COL_3" |   |

Table 9 shows the rewritten query for TPC-H Query 2 after ROWID Elimination Rewrite has been applied.

TABLE 9

Result of the ROWID Elimination Rewrite for TPC-H Q2

| SELECT |  | /*Q2*/ "FROM$_SUBQUERY$_001"."S_ACCTBAL" "S ACCTBAL", |
|---|---|---|
|  |  | "FROM$_SUBQUERY$_001"."S-NAME" "S_NAME", |
|  |  | "FROM$_SUBQUERY$_001"."N_NAME" "N_NAME", |
|  |  | "FROM$_SUBQUERY$_001"."P_PARTKEY" "P_PARTKEY", |
|  |  | "FROM$_SUBQUERY$_001"."P_MFGR" "P_MFGR", |
|  |  | "FROM$_SUBQUERY$_001"."S_ADDRESS" "S_ADDRESS", |
|  |  | "FROM$_SUBQUERY$_001"."S_PHONE" "S_PHONE", |
|  |  | "FROM$_SUBQUERY$_001"."S_COMMENT" "S_COMMENT" |
| FROM (SELECT |  | "VW_WIF_1"."ITEM_1" "S_ACCTBAL", |
|  |  | "VW_WIF_1"."ITEM_2" "S_NAME", |
|  |  | "VW_WIF_1"."ITEM_3" "N_NAME", |
|  |  | "VW_WIF_1"."ITEM_4" "P_PARTKEY", |
|  |  | "VW_WIF_1"."ITEM_5" "P_MFGR", |
|  |  | "VW_WIF_1"."ITEM_6" "S_ADDRESS", |
|  |  | "VW_WIF_1"."ITEM_7" "S_PHONE", |
|  |  | "VW_WIF_1"."ITEM_8" "S_COMMENT" |
|  | FROM (SELECT | "SUPPLIER"."S_ACCTBAL" "ITEM_1", |
|  |  | "SUPPLIER"."S_NAME" "ITEM_2", |
|  |  | "NATION"."N_NAME" "ITEM_3", |
|  |  | "PART"."P_PARTKEY" "ITEM_4", |
|  |  | "PART"."P_MFGR" "ITEM_5", |
|  |  | "SUPPLIER"."S_ADDRESS" "ITEM_6", |
|  |  | "SUPPLIER"."S_PHONE" "ITEM_7", |
|  |  | "SUPPLIER"."S_COMMENT" "ITEM_8", |
|  |  | CASE "PARTSUPP"."PS_SUPPLYCOST" |
|  |  | WHEN Min("PARTSUPP"."PS_SUPPLYCOST") |
|  |  | OVER ( |
|  |  | PARTITION BY |
|  |  | "PARTSUPP"."PS_PARTKEY") THEN |
|  |  | "PARTSUPP"."PARTKEY" |
|  |  | END "VW_COL_9" |
|  | FROM | "TPCH"."REGION" "REGION", |
|  |  | "TPCH"."NATION" "NATION", |
|  |  | "TPCH"."PARTSUPP" "PARTSUPP", |
|  |  | "TPCH"."SUPPLIER" "SUPPLIER", |
|  |  | "TPCH"."PART" "PART" |
|  | WHERE | "REGION"."R_NAME" = 'EUROPE' |
|  |  | AND "NATION"."N_REGIONKEY" = "REGION"."R_REGIONKEY" |
|  |  | AND "SUPPLIER"."S_NATIONKEY" = "NATION"."N_NATIONKEY" |

TABLE 9-continued

Result of the ROWID Elimination Rewrite for TPC-H Q2

|   |   |
|---|---|
|   | AND "PART"."P_TYPE" LIKE '%BRASS' |
|   | AND "PART"."P_SIZE" = 15 |
|   | AND "SUPPLIER"."S_SUPPKEY" = |
|   | "PARTSUPP"."PS_SUPPKEY" |
|   | AND "PART"."P_PARTKEY" = |
|   | "PARTSUPP"."PS_PARTKEY") |
|   | "VW_WIF_1" |
| WHERE | "VW_WIF_1"."VW_COL_9" IS NOT NULL |
| ORDER | BY "VW_WIF_1"."ITEM_1" DESC, |
|   | "VW_WIF_1"."ITEM_3", |
|   | "VW_WIF_1"."ITEM_2", |
|   | "VW_WIF_1"."ITEM_4") "FROM$_SUBQUERY$_001" |
| WHERE ROWNUM <= 100; | |

By substituting ROWIDs with primary keys, the rewritten queries shown in Tables 7-9 are semantically equivalent to the previously rewritten queries shown in Tables 2, 4, and 6, respectively. The rewritten queries shown in Tables 7-9, without referencing ROWIDs as they are substituted with primary keys, can be executed in an offload engine and can benefit from hardware acceleration features, thereby reducing memory pressure and speeding up processing.

Determining Removal of ROWID

In some scenarios, the ROWID Elimination Rewrite technique is able to simply remove one or more ROWIDs from a query altogether.

A candidate key is a column or a set of columns in a database that can qualify as a primary key. Candidate keys can be determined for intermediate relations after relational operators like INNER JOINs, SEMI JOINs, ANTI JOINSs, OUTER JOINSs, GROUP JOINs or GROUP BYs have been applied. Based on this, possible FDs can be deduced for an intermediate result that is direct input to a GROUP BY operator. If there exist a FD where a ROWID is depended on another ROWID or primary key and is not part of the projection list of the GROUP BY operator, then the ROWID could be removed as a grouping column.

Figure 4:
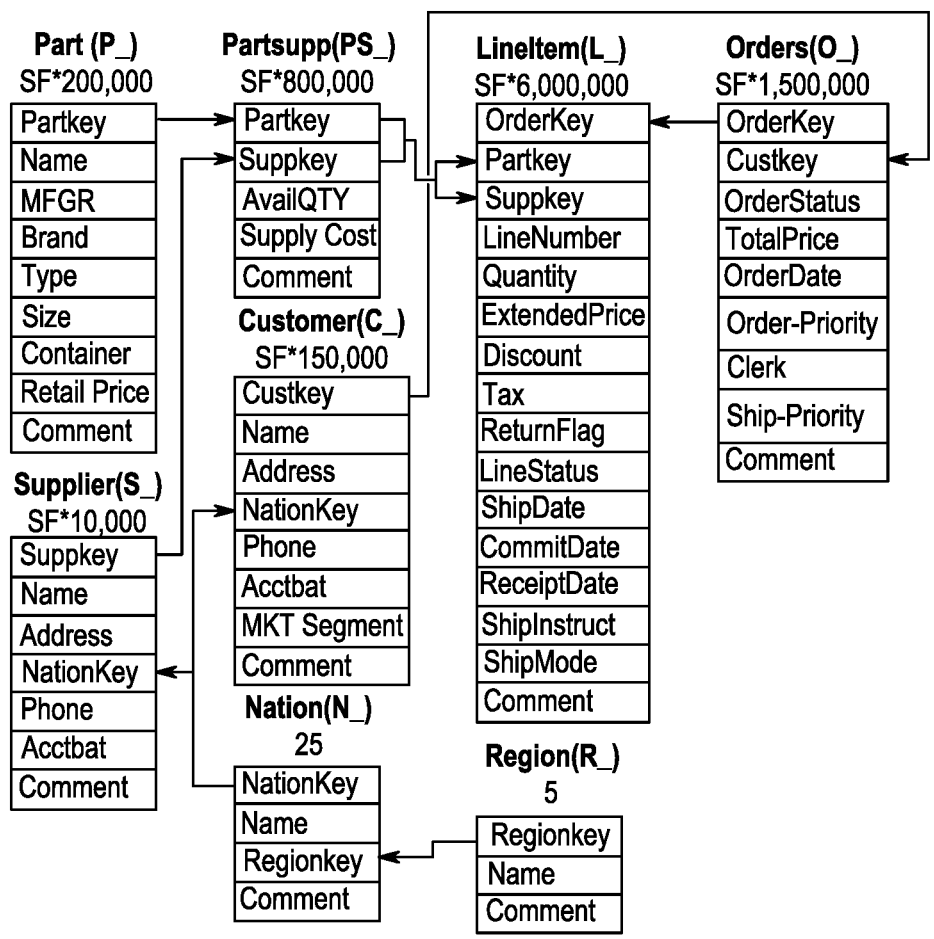
FIG. 4 illustrates an overview of a relational schema of the TPC-H Benchmark tables.

FIG. 4 illustrates an overview of a relational schema of the TPC-H Benchmark tables. The primary key/foreign key constraints between the tables are of interest.

For example, referring to the output of the sixth operator HASH JOIN depicted in FIG. 2, functional dependencies are:

{S_SUPPKEY}→{NATION_KEY}

{S_SUPPKEY, P_PARTKEY}→{PARTSUPP.ROWID}

From the second functional dependency, PARTSUPP.ROWID could be removed as a grouping column because for any unique value of the combination S_SUPPKEY, P_PARTKEY, there is only one value of PARTSUPP.ROWID. Hence, adding PARTSUPP.ROWID as grouping column does not add any additional group when applying the GROUP BY operator. Accordingly, PARTSUPP.ROWID could be safely removed.

From the first functional dependency, NATION_KEY or NATION.ROWID could also be removed as a grouping column. Although NATION_KEY or NATION.ROWID is part of the projection list of the subquery, which would be prevented from being removed, NATION_KEY or NATION.ROWID is not referenced in the parent query block. Hence, it could be safely removed because, from the first functional dependency, removing NATION_KEY or NATION.ROWID has no further effect on the distinct third operation HASH_UNIQUE operator depicted in FIG. 2.

Table 10 shows a rewritten query for TPC-H Query 20 after advanced ROWID Elimination Rewrite has been applied. This rewritten query only shows the PARTSUPP.ROWID being removed.

TABLE 10

Result of advanced ROWID Elimination Rewrite
for TPC-H Q20 (with NATION.ROWID not removed)

|   |   |
|---|---|
| SELECT | /*Q20*/ "VM_NWVW_3"."$VM_COL_3" "S_NAME", |
|   | "VM_NWVW_3"."$VM_COL_2" "S_ADDRESS" |
| FROM | (SELECT DISTINCT "SUPPLIER"."S_NAME" "$VM_COL_3", |
|   | "SUPPLIER".ROWID "ROWID", |
|   | "NATION". ROWID "ROWID", |
|   | "PARTSUPP"."PS_SUPPKEY" "$VM_COL_1", |
|   | "SUPPLIER"."S_ADDRESS" "$VM_COL_2" |
| FROM | "TPCH"."LINEITEM" "LINEITEM", |
|   | "TPCH"."PART" "PART", |
|   | "TPCH"."PARTSUPP" "PARTSUPP", |
|   | "TPCH"."SUPPLIER" "SUPPLIER", |
|   | "TPCH"."NATION" "NATION" |
| WHERE | "SUPPLIER"."S_SUPPKEY" = "PARTSUPP"."PS_SUPPKEY" |
|   | AND "SUPPLIER"."S_NATIONKEY" = |
|   | "NATION"."N_NATIONKEY" |
|   | AND "NATION"."N_NAME" = 'CANADA' |
|   | AND "LINEITEM"."L_PARTKEY" = |
|   | "PARTSUPP"."PS_PARTKEY" |
|   | AND "LINEITEM"."L_SUPPKEY" = |
|   | "PARTSUPP"."PS_SUPPKEY" |

TABLE 10-continued

Result of advanced ROWID Elimination Rewrite
for TPC-H Q20 (with NATION.ROWID not removed)

|  |  |  |
|---|---|---|
|  | AND | "PARTSUPP"."PS_PARTKEY" = "PART"."P_PARTKEY" |
|  | AND | "PART"."P_NAME" LIKE 'forest%' |
|  | AND | "LINEITEM"."L_SHIPDATE" >= To date ('⎵1994-01-01⎵00:00:00', 'syyyy-mm-dd⎵hh24:mi:ss') |
|  | AND | "LINEITEM"."L_SHIPDATE" < To date('⎵1995-01-01⎵00:00:00', 'syyyy-mm-dd⎵hh24:mi:ss') |
|  | AND | To date('⎵1995-01-01⎵00:00:00', 'syyyy-mm-dd⎵hh24:mi:ss') To date ('⎵1994-01-01⎵00:00:00', 'syyyy-mm-dd⎵hh24:mi:ss') |
|  | GROUP | BY "SUPPLIER"."S_NAME", "LINEITEM"."L_SUPPKEY", "PART"."P_PARTKEY", "PARTSUPP"."PS_AVAILQTY", "PARTSUPP"."PS_SUPPKEY", "NATION"."N_NATIONKEY", "SUPPLIER"."S_SUPPKEY", "LINEITEM"."L_PARTKEY", "SUPPLIER"."S_ADDRESS" |
|  | HAVING "PARTSUPP"."PS_AVAILQTY" > 0.5 * SUM( LINEITEM"."L_QUANTITY") ) "VM_NWVW_3" |  |
| ORDER | BY "VM_NWVW_3"."$VM_COL_3" |  |

For another example, referring to the output of the fifth operator VIEW_VM_VWVW 2 depicted in FIG. 1, a functional dependency is: {S_SUPPKEY}→{NATION_KEY}. As a result, the NATION.ROWID or the NATION_KEY column can be removed.

Table 11 shows the rewritten query for TPC-H Query 21 after advanced ROWID Elimination Rewrite has been applied.

TABLE 11

Result of advanced ROWID Elimination Rewrite for TPC-H Q21

```
SELECT   /*Q21*/ "FROM$_SUBQUERY$_001"."S_NAME" "S_NAME",
    "FROM$_SUBQUERY$_001"."NUMWAIT" "NUMWAIT"
FROM    (SELECT "VM_NWVW_2"."$VM_COL_1" "S_NAME",
                        Count (*) "NUMWAIT"
    FROM  (SELECT "SUPPLIER"."S_NAME" "$VM_COL_1"
        FROM    "TPCH"."LINEITEM" "L3",
                "TPCH"."SUPPLIER" "SUPPLIER",
                "TPCH"."LINEITEM" "L1",
                "TPCH"."ORDERS" "ORDERS",
                "TPCH"."NATION" "NATION"
        WHERE   "SUPPLIER"."S_SUPPKEY" = "L1"."L_SUPPKEY"
                AND "ORDERS"."O_ORDERKEY" = "L1"."L_ORDERKEY"
                AND "ORDERS"."O_ORDERSTATUS" = 'F'
                AND "L1"."L_RECEIPTDATE" >"L1"."L_COMMITDATE"
                AND 0 < 1
                AND "SUPPLIER"."S_NATIONKEY" =
                "NATION"."N_NATIONKEY"
                AND "NATION"."N_NAME" =
                'SAUDI⎵ARABIA'
                AND "L3"."L_ORDERKEY" = "L1"."L_ORDERKEY"
                AND "L3"."L_SUPPKEY" <> "L1"."L_SUPPKEY"
        GROUP BY        "L1"."L_ORDERKEY",
                        "L1"."L_LINENUMBER",
                        "ORDERS"."O_ORDERKEY",
                        "SUPPLIER"."S_SUPPKEY",
                        "SUPPLIER"."S_NAME"
        HAVING          SUM(CASE
                            WHEN "L3"."L_RECEIPTDATE" >
                            "L3"."L_COMMITDATE"
                        THEN   1
                        ELSE   0
                        END) = 0) "VM_NWVW_2"
```

TABLE 11-continued

Result of advanced ROWID Elimination Rewrite for TPC-H Q21

```
          GROUP BY "VM_NWVW_2"."$VM_COL_1"
          ORDER BY COUNT(*) DESC,
                             "VM_NWVW_2"."$VM_COL_1")
                         "FROM$_SUBQUERY$_001"
WHERE ROWNUM <= 100;
```

Query Optimizer Integration

There are several strategies for integrating the ROWID Elimination Rewrite into a cost-based optimizer.

One strategy is to add the ROWID Elimination Rewrite just as another rewrite rule. For example, Transformation-Based Query Optimizers, like Columbia or Cascades, can be extended to integrate the ROWID Elimination Rewrite.

There are two strategies to apply the ROWID Elimination Rewrite in a generative query optimizer. A first possibility is, as part of the Query Rewrite Phase I, the ROWID Elimination Rewrite could be placed after the family of Query Unnesting rewrites. A second possibility is to integrate the ROWID Elimination Rewrite into Query Rewrite Phase II. That is, once a QEP is formed, existing and eligible ROWID can be substituted by the ROWID Elimination Rewrite.

The first possibility has the advantage over the second possibility in that other optimizations can benefit as well from the ROWID Elimination Rewrite, such as index access path selection. Index path selection is particularly important since the substitutes for the ROWID columns are often primary key columns, where an index is most likely to be existent.

ROWID Elimination Rewrite Flow Example

Figure 5:
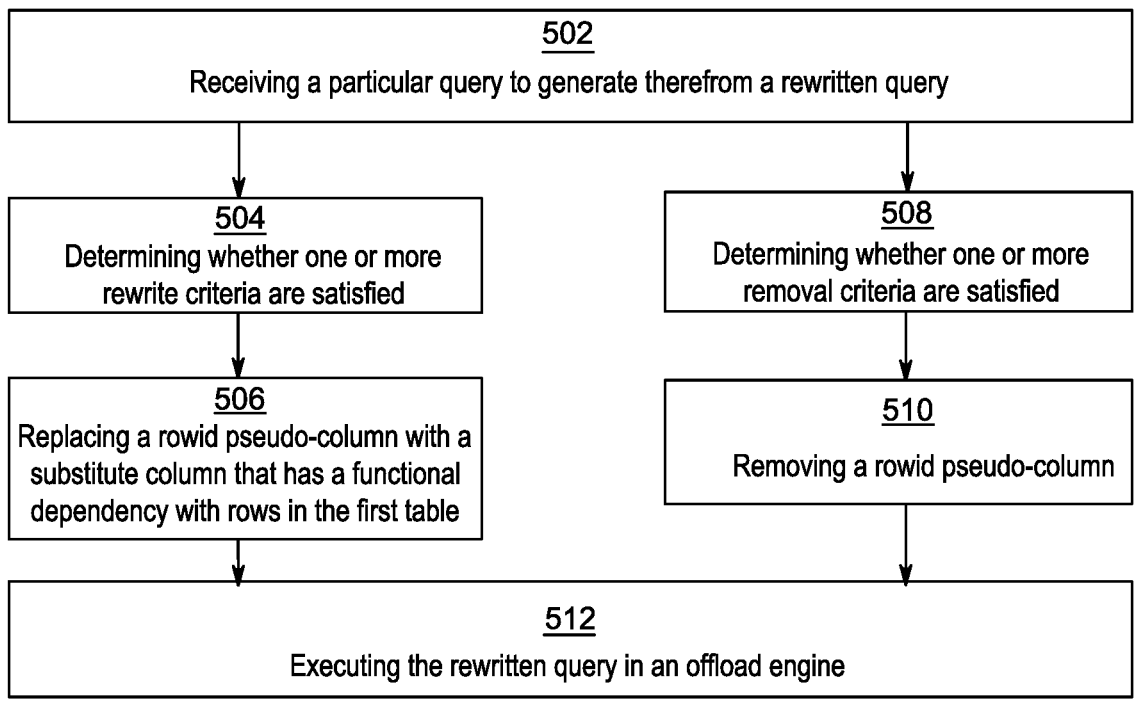
FIG. 5 illustrates a block diagram depicting a ROWID Elimination Rewrite technique according to an embodiment.

FIG. 5 illustrates a block diagram depicting a ROWID Elimination Rewrite technique according to an embodiment. At block 502, a DBMS (or, more particularly, an optimizer or rewrite component of the DBMS) receives a particular query to generate therefrom a rewritten query.

The particular query comprises a main or topmost query block. The particular query references a first rowid pseudo-column of a first table. The first rowid pseudo-column comprises first rowids that each uniquely identifies a row in the first table. In an embodiment, the particular query may also reference a second rowid pseudo-column of a second table. The second rowid pseudo-column comprises second rowids that each uniquely identifies a row in the second table.

In an embodiment, the particular query may be written from another query, such as an original query, that does not include the first rowid pseudo-column and the second rowid pseudo-column. The first rowid pseudo-column and the second rowid pseudo-column were added or introduced in the particular query when it was written from the another query. The particular query and the another query are semantically equivalent.

At block 504, the DBMS parses the particular query to determine whether one or more rewrite criteria are satisfied.

In an embodiment, a rewrite criterion may be the first rowid pseudo-column not being referenced as part of a projection list of the topmost query block.

In an embodiment, a rewrite criterion may be, when the first rowid pseudo-column is not referenced in a case statement, the first rowid pseudo-column being a root of an expression tree having a height not greater than one.

In an embodiment, a rewrite criterion may be, when the first rowid pseudo-column is referenced in a case statement, the case statement being at a root of an expression tree having a height greater than one.

In an embodiment, a rewrite criterion may be the first rowid pseudo-column being previously introduced through another one or more query rewrites, such as for purpose of query unnesting.

At block 506, in response to determining that one or more rewrite criteria are satisfied, the first rowid pseudo-column is replaced with a substitute column that has a functional dependency with rows in the first table, in the rewritten query. The substitute column includes a unique value for each tuple in the first table. In an embodiment, the substitute column may be a primary key of the first table.

At block 508, the DBMS parses the particular query to determine whether one or more removal criteria are satisfied.

In an embodiment, a removal criteria may be the second rowid pseudo-column being dependent on the first rowid pseudo-column and not being referenced as part of a projection list of a group by operator in the particular query.

At block 510, in response to determining that one or more removal criteria are satisfied, the second rowid pseudo-column is removed, in the rewritten query.

Block 504 and block 506 may occur concurrently or sequentially. The rewritten query and the particular query are semantically equivalent.

At block 512, the rewritten query is executed in an offload engine. The rewritten query, without referencing any rowid pseudo-columns, do not increase memory pressure when it is executed in the offload engine.

Advantages of ROWID Elimination Rewrite Techniques

ROWID Elimination Rewrite technique substitutes ROW-IDs with other columns of the same table. In some scenarios, the ROWID Elimination Rewrite can eliminate the usage of a ROWIDs without the need of introducing a new column, because the substituting column may already be referenced. In almost all practical cases, this leads to a smaller memory footprint, which speeds up processing.

By substituting ROWIDs with other columns, the grouping operation can be sped up, given that the new columns are indexed. In many cases, the cost based optimizer can be using interesting orders to transform a hashed based group by into a sort based group by without the need of the sorting operation by utilizing the underlying index.

As a consequence, performance improvements can be major because a previously not feasible query can be offloaded, memory footprint is reduced and/or grouping operations can be executed at some fraction of the previous costs.

Database Overview

Embodiments of the present invention are used in the context of database management systems (DBMSs). Therefore, a description of an example DBMS is provided.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

A database dictionary, also referred to herein as a data dictionary, comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

A tablespace is a database storage unit that groups related logical structures together, and contains one or more physical data files. These logical structures may include segments, or an allocation of space for a specific database object such as a table, a table cluster, or an index. A segment may be contained in one data file or may span across multiple data files. A segment may be defined using a set of extents, where an extent contains one or more contiguous database blocks.

A database block, also referred to as a data block, is a unit of persistent storage. A database block is used by a database server to store database records (e.g., to store rows of a table, to store column values of a column). When records are read from persistent storage, a database block containing the record is copied into a database block buffer in volatile memory of a database server. A database block usually contains multiple rows, and control and formatting information (e.g., offsets to sequences of bytes representing rows or other data structures, list of transactions affecting a row).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

A data block may be associated with a data block address that uniquely identifies the data block and the data block's storage location within a storage device. A database server may request from a storage device a data block by data block address, or even by primary block address ranges of data blocks.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11 g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Optimization and Execution Plans

Query optimization generates one or more different candidate execution plans for a query, which are evaluated by the query optimizer to determine which execution plan should be used to compute the query.

Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

Hardware Overview

Figure 6:
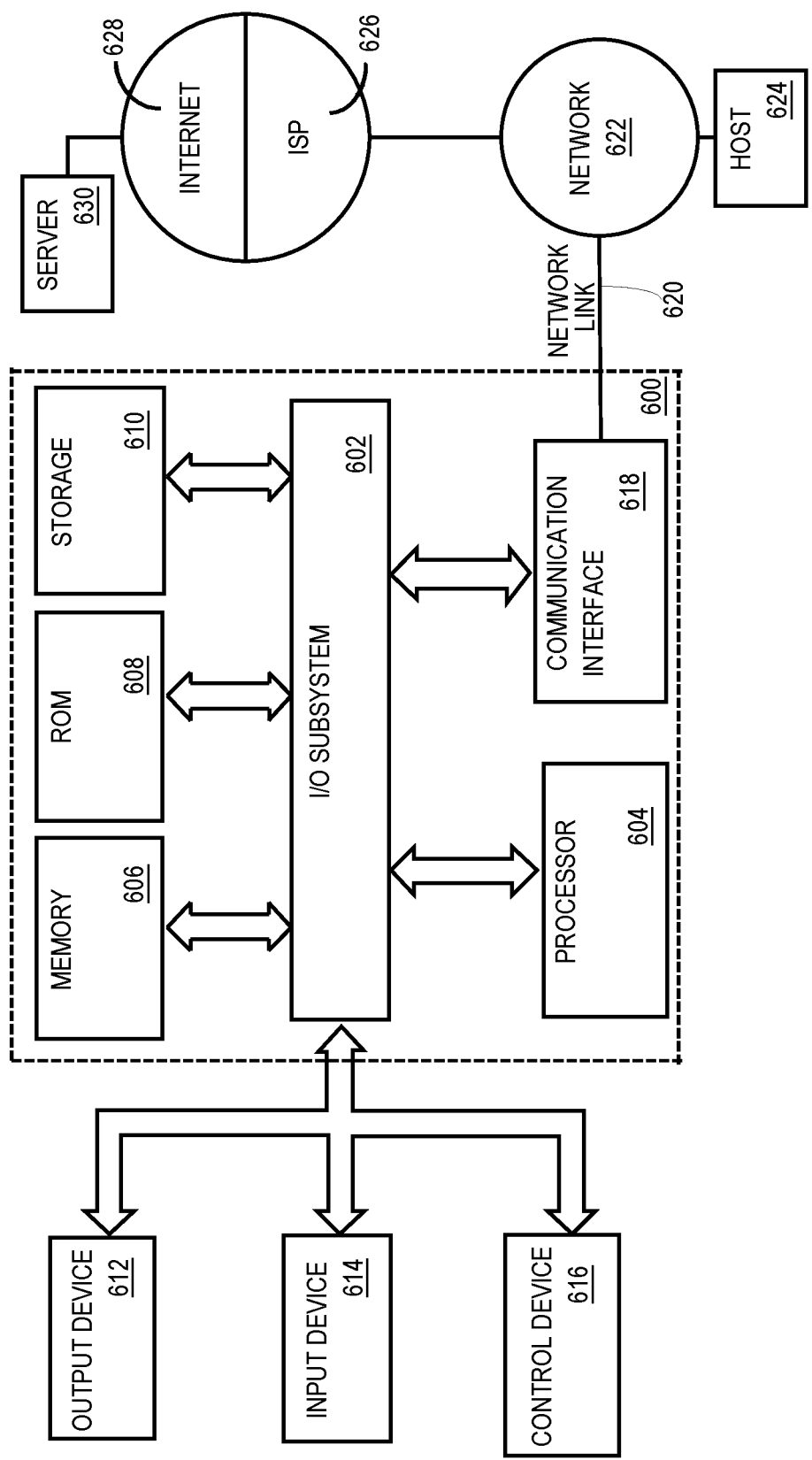
FIG. 6 illustrates a block diagram of a computing device in which the example embodiment(s) of the present invention may be embodiment.

Referring now to FIG. 6, it is a block diagram that illustrates a basic computing device 600 in which the example embodiment(s) of the present invention may be embodied. Computing device 600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 600 may include a bus 602 or other communication mechanism for addressing main memory 606 and for transferring data between and among the various components of device 600.

Computing device 600 may also include one or more hardware processors 604 coupled with bus 602 for processing information. A hardware processor 604 may be a general purpose microprocessor, a system on a chip (SoC), or other processor.

Main memory 606, such as a random access memory (RAM) or other dynamic storage device, also may be coupled to bus 602 for storing information and software instructions to be executed by processor(s) 604. Main memory 606 also may be used for storing temporary variables or other intermediate information during execution of software instructions to be executed by processor(s) 604.

Software instructions, when stored in storage media accessible to processor(s) 604, render computing device 600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 600 also may include read only memory (ROM) 608 or other static storage device coupled to bus 602 for storing static information and software instructions for processor(s) 604.

One or more mass storage devices 610 may be coupled to bus 602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 610 (e.g., the main hard disk for the device) stores a body of program and data for directing operation of the computing device, including an operating system, user application programs, driver and other support files, as well as other data files of all sorts.

Computing device 600 may be coupled via bus 602 to display 612, such as a liquid crystal display (LCD) or other electronic visual display, for displaying information to a computer user. In some configurations, a touch sensitive surface incorporating touch detection technology (e.g., resistive, capacitive, etc.) may be overlaid on display 612 to form a touch sensitive display for communicating touch gesture (e.g., finger or stylus) input to processor(s) 604.

An input device 614, including alphanumeric and other keys, may be coupled to bus 602 for communicating information and command selections to processor 604. In addition to or instead of alphanumeric and other keys, input device 614 may include one or more physical buttons or switches such as, for example, a power (on/off) button, a "home" button, volume control buttons, or the like.

Another type of user input device may be a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

While in some configurations, such as the configuration depicted in FIG. 6, one or more of display 612, input device 614, and cursor control 616 are external components (i.e., peripheral devices) of computing device 600, some or all of display 612, input device 614, and cursor control 616 are integrated as part of the form factor of computing device 600 in other configurations.

Functions of the disclosed systems, methods, and modules may be performed by computing device 600 in response to processor(s) 604 executing one or more programs of software instructions contained in main memory 606. Such software instructions may be read into main memory 606 from another storage medium, such as storage device(s) 610. Execution of the software instructions contained in main memory 606 cause processor(s) 604 to perform the functions of the example embodiment(s).

While functions and operations of the example embodiment(s) may be implemented entirely with software instructions, hard-wired or programmable circuitry of computing device 600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more software instructions to processor(s) 604 for execution. For example, the software instructions may initially be carried on a magnetic disk or solid-state drive of a remote computer. The remote computer can load the software instructions into its dynamic memory and send the software instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor(s) 604 retrieves and executes the software instructions. The software instructions received by main memory 606 may optionally be stored on storage device(s) 610 either before or after execution by processor(s) 604.

Computing device 600 also may include one or more communication interface(s) 618 coupled to bus 602. A communication interface 618 provides a two-way data communication coupling to a wired or wireless network link 620 that is connected to a local network 622 (e.g., Ethernet network, Wireless Local Area Network, cellular phone network, Bluetooth wireless network, or the like). Communication interface 618 sends and receives electrical, electromagnetic, or optical signals that carry digital data streams representing various types of information. For example, communication interface 618 may be a wired network interface card, a wireless network interface card with an integrated radio antenna, or a modem (e.g., ISDN, DSL, or cable modem).

Network link(s) 620 typically provide data communication through one or more networks to other data devices. For example, a network link 620 may provide a connection through a local network 622 to a host computer 624 or to data equipment operated by an Internet Service Provider (ISP) 626. ISP 626 in turn provides data communication services through the world wide packet data communication network now commonly referred to as the "Internet" 628. Local network(s) 622 and Internet 628 use electrical, electromagnetic or optical signals that carry digital data streams. The signals through the various networks and the signals on network link(s) 620 and through communication interface(s) 618, which carry the digital data to and from computing device 600, are example forms of transmission media.

Computing device 600 can send messages and receive data, including program code, through the network(s), network link(s) 620 and communication interface(s) 618. In the Internet example, a server 630 might transmit a requested code for an application program through Internet 628, ISP 626, local network(s) 622 and communication interface(s) 618.

The received code may be executed by processor 604 as it is received, and/or stored in storage device 610, or other non-volatile storage for later execution.

Software Overview

FIG. 7 is a block diagram of a basic software system 700 that may be employed for controlling the operation of computing device 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing device 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on device 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of device 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the device 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of device 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
   generating a rewritten query from a particular query, wherein the particular query references a first rowid pseudo-column of a first table, said first rowid pseudo-column comprising first rowids that each uniquely identifies a row in said first table, wherein said rewritten query and said particular query are semantically equivalent, wherein generating a rewritten query comprises:
   determining that one or more rewrite criteria are satisfied, wherein said particular query comprises a topmost query block, wherein said rewrite criteria includes said first rowid pseudo-column not being referenced as part of a projection list of said topmost query block; and
   in response to determining that one or more rewrite criteria are satisfied, replacing said first rowid pseudo-column with a substitute column that has a functional dependency with rows in said first table and that cannot be NULL for said rewritten query; and
   executing said rewritten query in an offload engine, wherein data for said first table is loaded into said offload engine without loading said first rowids.

2. The method of claim 1, wherein said one or more rewrite criteria include, when said first rowid pseudo-column is not referenced in a case statement, said first rowid pseudo-column being a root of an expression tree and height of said expression tree not being greater than one.

3. The method of claim 1, wherein said one or more rewrite criteria include, when said first rowid pseudo-column is referenced in a case statement, said case statement being at a root of an expression tree and height of said expression tree being greater than one.

4. The method of claim 1, wherein said one or more rewrite criteria include said first rowid pseudo-column being previously introduced through another query rewrite.

5. The method of claim 1, wherein said substitute column is a primary key of said first table.

6. The method of claim 1, wherein said substitute column includes a unique value for each tuple in said first table.

7. The method of claim 1, further comprising rewriting another query to generate said particular query, wherein said another query does not include said first rowid pseudo-column, wherein rewriting said another query includes adding said first rowid pseudo-column to said particular query.

8. The method of claim 7, wherein said another query, said particular query, and said rewritten query are all semantically equivalent.

9. The method of claim 1, wherein the particular query references a second rowid pseudo-column of a second table, said second rowid pseudo-column comprising second rowids that each uniquely identifies a row in said second table.

10. The method of claim 9, wherein generating a rewritten query further comprises:
    determining that one or more removal criteria are satisfied;
    in response to determining that one or more removal criteria are satisfied, removing said second rowid pseudo-column.

11. The method of claim 10, wherein said one or more removal criteria include said second rowid pseudo-column being dependent on said first rowid pseudo-column and not being referenced as part of a projection list of a group by operator.

12. One or more non-transitory computer-readable storage medium storing instructions that, when executed by one or more processors, cause the one or more processors to perform functions comprising:
    generating a rewritten query from a particular query, wherein the particular query references a first rowid pseudo-column of a first table, said first rowid pseudo-column comprising first rowids that each uniquely identifies a row in said first table, wherein said rewritten query and said particular query are semantically equivalent wherein generating a rewritten query comprises:
    determining that one or more rewrite criteria are satisfied, wherein said particular query comprises a topmost query block, wherein said rewrite criteria includes said first rowid pseudo-column not being referenced as part of a projection list of said topmost query block; and
    in response to determining that one or more rewrite criteria are satisfied, replacing said first rowid pseudo-column with a substitute column that has a functional dependency with rows in said first table and that cannot be NULL for said rewritten query; and executing said rewritten query in an offload engine, wherein data for said first table is loaded into said offload engine without loading said first rowids.

13. The one or more non-transitory computer-readable storage medium of claim 12, wherein said one or more rewrite criteria include, when said first rowid pseudo-column is not referenced in a case statement, said first rowid pseudo-column being a root of an expression tree and height of said expression tree not being greater than one.

14. The one or more non-transitory computer-readable storage medium of claim 12, wherein said one or more rewrite criteria include, when said first rowid pseudo-column is referenced in a case statement, said case statement being at a root of an expression tree and height of said expression tree being greater than one.

15. The one or more non-transitory computer-readable storage medium of claim 12, wherein said one or more rewrite criteria include said first rowid pseudo-column being previously introduced through another query rewrite.

16. The one or more non-transitory computer-readable storage medium of claim 12, wherein said substitute column is a primary key of said first table.

17. The one or more non-transitory computer-readable storage medium of claim 12, wherein said substitute column includes a unique value for each tuple in said first table.

18. The one or more non-transitory computer-readable storage medium of claim 12, wherein the functions further comprise rewriting another query to generate said particular query, wherein said another query does not include said first rowid pseudo-column, wherein rewriting said another query includes adding said first rowid pseudo-column to said particular query.

19. The one or more non-transitory computer-readable storage medium of claim 18, wherein said another query, said particular query, and said rewritten query are all semantically equivalent.

20. The one or more non-transitory computer-readable storage medium of claim 12, wherein the particular query references a second rowid pseudo-column of a second table, said second rowid pseudo-column comprising second rowids that each uniquely identifies a row in said second table.

21. The one or more non-transitory computer-readable storage medium of claim 20, wherein generating a rewritten query further comprises:

determining that one or more removal criteria are satisfied;

in response to determining that one or more removal criteria are satisfied, removing said second rowid pseudo-column.

22. The one or more non-transitory computer-readable storage medium of claim 21, wherein said one or more removal criteria include said second rowid pseudo-column being dependent on said first rowid pseudo-column and not being referenced as part of a projection list of a group by operator.

* * * * *

UNITED STATES PATENT AND TRADEMARK OFFICE
CERTIFICATE OF CORRECTION

| | | |
|---|---|---|
| PATENT NO. | : 11,797,520 B2 | Page 1 of 1 |
| APPLICATION NO. | : 16/699524 | |
| DATED | : October 24, 2023 | |
| INVENTOR(S) | : Fender et al. | |

It is certified that error appears in the above-identified patent and that said Letters Patent is hereby corrected as shown below:

On the Title Page

Column 2, under Other Publications, Line 2, delete "Inuential Benchmar"," and insert -- Influential Benchmark", --, therefor.

In the Specification

In Column 4, Line 2, delete "scan," and insert -- scan), --, therefor.

In the Claims

In Column 30, Line 58, in Claim 12, delete "equivalent" and insert -- equivalent, --, therefor.

Signed and Sealed this
Eleventh Day of June, 2024

Katherine Kelly Vidal
*Director of the United States Patent and Trademark Office*